UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

STORAGE-BATTERY ELECTRODE.

No. 857,929.      Specification of Letters Patent.      Patented June 25, 1907.

Application filed March 30, 1905. Serial No. 252,935.

*To all whom it may concern:*

Be it known that I, THOMAS ALVA EDISON, a citizen of the United States, residing at Llewellyn Park, Orange, in the county of Essex and State of New Jersey, have invented certain new and useful Improvements in Storage-Battery Electrodes, of which the following is a description.

In my improved iron-nickel storage battery, the active material in the positive electrode is admixed with a flake-like or foliated conducting substance by which contact between the active particles is secured. The material which I have heretofore used for this purpose is flake graphite, which is cheap and capable of being subdivided into flakes or scales of great thinness. I find, however, that flake graphite when subjected to the effect of prolonged electrolysis in an alkaline solution, undergoes a change in its contact resistance, so that after a long time, a sufficient change in this respect may take place as to diminish the capacity of the battery. In experimenting with insoluble metals in a flake-like or foliated form, I ascertained the curious fact that in the case of metallic nickel, it is quite difficult to secure good contact in an alkaline solution unless excessively high contact pressure is used. This phenomenon may be possibly attributed to the formation of an invisible and excessively thin film of non-conducting oxid on the metallic surfaces under the effect of electrolysis. Metallic cobalt on the other hand, is not open to this objection, for although its surface is very slightly attacked by electrolysis yet good contact with the active particles may be secured when mixed therewith, even when no pressure is used other than the weight of the particles themselves. It is possible, however, that the very slight electrolytic action on the metallic flakes or scales, if made wholly of cobalt, might, in a long time, gradually disintegrate the same, and for this reason I consider it undesirable to rely on metallic cobalt alone. I therefore prefer to make use of a nickel-cobalt alloy, containing say—60 per cent of cobalt and 40 per cent of nickel made in any suitable way, such as by fusion of the two metals, or by simultaneous electrolytic deposition, as I describe in my application for Letters Patent filed concurrently herewith. In the case of the alloy made by fusion, the latter may be converted into flakes or scales by methods familiar to those skilled in the art, as for instance by rolling or stamping with oil, as practiced in the manufacture of bronze powder. In the case of electrolytic deposition, the films, as I describe in my said concurrent application, will naturally form into flakes or scales, assuming curled, wrinkled, or curved shapes. With such a cobalt-metal alloy, good contact with the active material will be secured by the mere weight of the latter without additional pressure, while at the same time the very slight electrolytic action on the cobalt will not penetrate into the alloy to a harmful extent, so that the flakes will preserve their metallic identity. This desirable characteristic of the nickel-cobalt alloy is present even when the proportions of the two metals are widely varied.

The scales, flakes, foils or films of the metallic cobalt or cobalt nickel alloy are added to the active material in any suitable way, examples of which I disclose in my concurrent applications. For instance, the active particles of nickel hydroxid in the form of dry granules may be covered with a sticky material, such as molasses. The metallic foils may be then added to entirely cover the surfaces of said granules; the mass so obtained may be then placed in the usual perforated pockets and a moderate pressure applied, after which the molasses is entirely dissolved out, and a final pressure applied to effectively consolidate the entire mass. Or instead, the metallic conducting foils or flakes may be formed into a spongy or honeycomb coherent integral structure by welding a loose mass of the metallic flakes, after which the active material may be introduced within the same by successively dipping into a solution of the active salt and alternate evaporating operations.

Having now described my invention what I claim as new therein and desire to secure by Letters Patent is as follows:

1. An electrode mass for storage batteries employing alkaline electrolytes, comprising an intimate mixture of a suitable active material and metallic flakes, scales or films formed wholly or in part of metallic cobalt, substantially as set forth.

2. An electrode mass for storage batteries employing alkaline electrolytes, comprising an intimate mixture of nickel hydroxid and metallic flakes, scales or films formed wholly or in part of metallic cobalt, substantially as set forth.

3. An electrode mass for storage batteries employing alkaline electrolytes, comprising an intimate mixture of a suitable active material, and flakes, scales or films of cobalt-nickel alloy, substantially as set forth.

4. An electrode mass for storage batteries employing alkaline electrolytes, comprising an intimate mixture of nickel hydroxid, and flakes, scales or films of cobalt nickel alloy, substantially as set forth.

5. A flake-like insoluble, conducting material for admixture with the active material of storage batteries employing alkaline electrolytes, comprising scales, flakes or foils formed wholly or in part of metallic cobalt, substantially as set forth.

6. A flake-like insoluble conducting material for admixture with the active material of storage batteries employing alkaline electrolytes, comprising scales, flakes or foils, formed of a nickel cobalt alloy, substantially as set forth.

This specification signed and witnessed this 29th day of March, 1905.

THOMAS A. EDISON.

Witnesses:
FRANK L. DYER,
ANNA R. KLEHM.

---

Correction in Letters Patent No. 857,929.

It is hereby certified that in Letters Patent No. 857,929, granted June 25, 1907, upon the application of Thomas A. Edison, of Llewellyn Park, Orange, New Jersey, for an improvement in "Storage-Battery Electrodes," an error appears in the printed specification requiring correction, as follows: In line 64, page 1, the word "metal" should read *nickel;* and that the said Letters Patent should be read with this correction therein that the same may conform to the record of the case in the Patent Office.

Signed and sealed this 16th day of July, A. D., 1907.

[SEAL.]

C. C. BILLINGS,
*Acting Commissioner of Patents.*

2. An electrode mass for storage batteries employing alkaline electrolytes, comprising an intimate mixture of nickel hydroxid and metallic flakes, scales or films formed wholly or in part of metallic cobalt, substantially as set forth.

3. An electrode mass for storage batteries employing alkaline electrolytes, comprising an intimate mixture of a suitable active material, and flakes, scales or films of cobalt-nickel alloy, substantially as set forth.

4. An electrode mass for storage batteries employing alkaline electrolytes, comprising an intimate mixture of nickel hydroxid, and flakes, scales or films of cobalt nickel alloy, substantially as set forth.

5. A flake-like insoluble, conducting material for admixture with the active material of storage batteries employing alkaline electrolytes, comprising scales, flakes or foils formed wholly or in part of metallic cobalt, substantially as set forth.

6. A flake-like insoluble conducting material for admixture with the active material of storage batteries employing alkaline electrolytes, comprising scales, flakes or foils, formed of a nickel cobalt alloy, substantially as set forth.

This specification signed and witnessed this 29th day of March, 1905.

THOMAS A. EDISON.

Witnesses:
FRANK L. DYER,
ANNA R. KLEHM.

---

Correction in Letters Patent No. 857,929.

It is hereby certified that in Letters Patent No. 857,929, granted June 25, 1907, upon the application of Thomas A. Edison, of Llewellyn Park, Orange, New Jersey, for an improvement in "Storage-Battery Electrodes," an error appears in the printed specification requiring correction, as follows: In line 64, page 1, the word "metal" should read *nickel;* and that the said Letters Patent should be read with this correction therein that the same may conform to the record of the case in the Patent Office.

Signed and sealed this 16th day of July, A. D., 1907.

[SEAL.]

C. C. BILLINGS,
*Acting Commissioner of Patents.*

Correction in Letters Patent No. 857,929.

It is hereby certified that in Letters Patent No. 857,929, granted June 25, 1907, upon the application of Thomas A. Edison, of Llewellyn Park, Orange, New Jersey, for an improvement in "Storage-Battery Electrodes," an error appears in the printed specification requiring correction, as follows: In line 64, page 1, the word "metal" should read *nickel;* and that the said Letters Patent should be read with this correction therein that the same may conform to the record of the case in the Patent Office.

Signed and sealed this 16th day of July, A. D., 1907.

[SEAL.]

C. C. BILLINGS,
*Acting Commissioner of Patents.*